US010539077B2

(12) United States Patent
Py et al.

(10) Patent No.: US 10,539,077 B2
(45) Date of Patent: Jan. 21, 2020

(54) DEVICE FOR DRAINING LIQUIDS FOR AN AIRCRAFT ENGINE

(71) Applicant: Turbomeca, Bordes (FR)

(72) Inventors: Jean-Michel Pierre Claude Py, Pardies Pietat (FR); Philippe Jean René Marie Benezech, Morlaas (FR); Sébastien Combebias, Asson (FR); Sébastien Fouche, Hasparren (FR); Lorenzo Huacan Hernandez, Bizanos (FR); Eric Le Borgne, Igon (FR); Lionel Napias, Sedze Maubecq (FR); Maxime Quaireau, Soumoulou (FR); Philippe Roger, Bizanos (FR); Cédric Zordan, Narcastet (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 333 days.

(21) Appl. No.: 15/104,462

(22) PCT Filed: Dec. 15, 2014

(86) PCT No.: PCT/FR2014/053333
§ 371 (c)(1),
(2) Date: Jun. 14, 2016

(87) PCT Pub. No.: WO2015/092243
PCT Pub. Date: Jun. 25, 2015

(65) Prior Publication Data
US 2016/0312707 A1  Oct. 27, 2016

(30) Foreign Application Priority Data
Dec. 19, 2013 (FR) .................. 13 63087

(51) Int. Cl.
*B64D 45/00* (2006.01)
*B64D 37/26* (2006.01)
(Continued)

(52) U.S. Cl.
CPC ............ *F02C 7/232* (2013.01); *B64C 1/1453* (2013.01); *B64D 45/00* (2013.01);
(Continued)

(58) Field of Classification Search
CPC ........ B64C 1/1453; B64D 33/00; B64D 37/26
See application file for complete search history.

(56) References Cited

U.S. PATENT DOCUMENTS

| 3,556,444 A | 1/1971 | Kopp |
| 3,623,053 A | 11/1971 | Meyer |

(Continued)

FOREIGN PATENT DOCUMENTS

| EP | 2 626 616 A1 | 8/2013 |
| FR | 1.597.209 A | 7/1970 |
| JP | 2006242083 A | 9/2006 |

OTHER PUBLICATIONS

International Search Report dated Apr. 1, 2015, issued in corresponding International Application No. PCT/FR2014/053333, filed Dec. 15, 2014, 2 pages.
(Continued)

*Primary Examiner* — Richard R. Green
(74) *Attorney, Agent, or Firm* — Christensen O'Connor Johnson Kindness PLLC

(57) ABSTRACT

Device for draining liquids for an aircraft engine, comprising a collector designed to collect liquids drained from the engine, said device comprising means for pumping the liquids held in the collector and for discharging said liquids, and monitoring means designed to indicate when the liquids have been collected by the collector in an anomalous man-
(Continued)

ner, said monitoring means being designed to be activated when the flow rate of collected liquids is greater than the delivery of the pumping means.

19 Claims, 4 Drawing Sheets

(51) Int. Cl.
    *F02C 7/232*     (2006.01)
    *B64C 1/14*     (2006.01)
    *F01M 11/04*     (2006.01)

(52) U.S. Cl.
    CPC ......... *F01M 11/0458* (2013.01); *B64D 37/26* (2013.01); *F05D 2220/329* (2013.01); *F05D 2260/602* (2013.01); *F05D 2270/80* (2013.01)

(56) References Cited

U.S. PATENT DOCUMENTS

| | | | | |
|---|---|---|---|---|
| 5,285,636 A * | 2/1994 | Mayo | ...................... | B64D 1/16 244/129.1 |
| 6,571,562 B2 * | 6/2003 | Wilcox | .................. | F01M 11/04 244/129.1 |
| 6,578,361 B1 * | 6/2003 | Higginbotham | ........ | F01D 5/005 60/39.094 |
| 2013/0201023 A1 | 8/2013 | Mougin et al. | | |
| 2013/0327059 A1 * | 12/2013 | Richardson | ........... | B64C 1/1453 60/797 |
| 2015/0000749 A1 * | 1/2015 | Holmes | ................. | B64C 1/1453 137/1 |

OTHER PUBLICATIONS

Written Opinion of the International Searching Authority dated Apr. 1, 2015, issued in corresponding International Application No. PCT/FR2014/053333, filed Dec. 15, 2014, 5 pages.

Written Opinion of the International Searching Authority dated Apr. 1, 2015, issued in corresponding International Application No. PCT/FR2014/053333, filed Dec. 15, 2014, 7 pages.

International Preliminary Report on Patentability dated Jun. 21, 2016, issued in corresponding International Application No. PCT/FR2014/053333, filed Dec. 15, 2014, 1 page.

* cited by examiner

DEVICE FOR DRAINING LIQUIDS FOR AN AIRCRAFT ENGINE

TECHNICAL FIELD

Embodiments of the present disclosure relate to a device for draining liquids for an aircraft engine, to an aircraft engine comprising such a device, and to a method for inspecting the engine.

BACKGROUND

In engines for aircraft such as helicopters, it is often necessary to discharge different types of liquids, for example fuel or oil, to prevent the liquids from building up and disrupting the functioning of the engines. For example, some engines require purging operations, which cause losses of liquids (fuel, oil, etc.) that have to be recovered and treated.

In the current state of the art, a return tank is provided for recovering the liquids, i.e. at least one duct is provided to convey the liquids to the aircraft fuel tank. However, this technology has several drawbacks. Indeed, the aircraft manufacturer is forced to provide the return tank used for recovering the different liquids drained from the engine. This technical constraint is exacerbated by the fact that the flow rates and temperatures of the liquids may be high. Leaks can also result from "latent" faults. Moreover, the recovered oil contaminates the fuel stored in the tank. Having to deal with these potential leaks thus places great restrictions on the aircraft manufacturer and does not help the incorporation of the engine on aircrafts that do not have a return tank.

In addition, oil or fuel leaks can occur in the engine as a result of some parts having a faulty seal, yet this may not actually affect the functioning of the parts. In the current state of the art, a maintenance operation is carried out immediately after detection of leaks of this type, which have no adverse effect on the engine, and this increases the frequency of these operations and the overall maintenance costs for an aircraft engine. This is the case in particular in HMU hydromechanical systems, the dynamic seal of which can produce external leaks. The fuel leaks in the region of the drain of the drive are the main reason for pump units/HMUs being removed, even though the leaks do not have a significant impact on the functioning of the engine. It would thus be desirable to be able to keep an HMU hydromechanical system in operation, even if the dynamic seal thereof is not perfect.

Several solutions are known for discharging the liquids drained from an aircraft engine, yet none of these effectively and fully addresses the problem and requirements set out above. For example, one solution is to discharge the drained liquids to a scupper of the engine deck. This solution is unsatisfactory because it leads to liquids being dumped into the atmosphere or onto the runway, which is tolerated less and less. Another solution is to provide the engine with a treatment device for the drain of the liquids, the device comprising a collector designed to collect the liquids drained from the engine. This collector can be connected to the exhaust nozzle of the engine by means of a duct in such a way that the drained liquids are conveyed and pumped from the collector to the jet nozzle where they are combusted. In this case, flames and smoke may appear at the outlet of the jet nozzle, and this is not pleasant to see, in particular when the engine is started up.

The object of the present disclosure is to find a solution to the problem and requirements set out above.

SUMMARY

Embodiments of the present disclosure relate to a device for draining liquids for an aircraft engine, comprising a collector designed to collect liquids drained from the engine.

According to the disclosure, the draining device comprises means for pumping the liquids held in the collector and for discharging the liquids, and monitoring means designed to indicate when the liquids have been collected by the collector in an anomalous manner, the monitoring means being designed to be activated when the flow rate of collected liquids is greater than the delivery of the pumping means.

As in the prior art, the collector recovers the various drained liquids (oil, fuel, etc.) from the engine. The pumping and discharging means allow the liquids to be pumped from the collector in order to discharge them. Lastly, the monitoring means allow the flow rate of the collected liquids to be monitored and make it possible to detect when this flow rate is anomalous. The flow rate is anomalous when it is greater than the delivery of the pumping means. Therefore, the pumping delivery is preferably set at a threshold value (of approximately several liters per hour, for example) corresponding to normal functioning of the engine, i.e. to functioning for which the liquid losses and leaks that may occur do not affect the functioning of the engine (i.e. except when there is an engine fault). In other words, during normal operation, the pumping means discharge all the liquids collected in the collector when the pumping means are active. On the other hand, in the event of a malfunction and large liquid leaks, i.e. when there is an engine fault, the delivery of the pumping means is no longer sufficient for discharging the liquids collected in the collector. The monitoring means are thus designed to be activated and thus detect this anomalous situation. A maintenance operation can then be carried out on the engine. The monitoring means of the device according to the disclosure thus make it possible to limit the maintenance operations to those cases when large leaks of drained liquids are detected, and this is particularly advantageous especially in terms of the engine maintenance costs. The monitoring means thus prevent engine parts being removed prematurely and minimize the periodic inspections of the prior art.

The draining device according to the disclosure minimizes the contact with the aircraft manufacturer and makes it unnecessary to have a return tank. Advantageously, the draining device thus does not have a return tank.

According to an embodiment, the pumping means comprise an electric, mechanical or pneumatic pump.

In a variant, the pumping means can comprise a jet pump ejector. This ejector can comprise a first line for the flow of drained liquids, one end of which forms an inlet for the liquids held in the collector and the other end of which forms an outlet for discharging the liquids, and a second line for atomizing pressurized gas, which line extends around or inside the first line and is designed so that the atomized gas leaving the second line forces the liquids to be discharged through the outlet of the first line.

The first line can be connected to a valve, for example a flap valve. In one embodiment, this valve is controlled electrically or mechanically. In a variant, the valve can be controlled by a pressurized fluid, the valve being closed when the fluid pressure is lower than a particular threshold and open when the pressure is above this threshold. The valve thus makes it possible to control the flow of the drained liquids in the first line. This can make it possible to precisely control the time at which the drained liquids are discharged so that they are not discharged as the engine is ignited, for example.

The second line of the ejector can comprise a gas inlet connected to means for bleeding pressurized gas, for example from a compressor of the engine. The gas inlet of the second line of the ejector can be connected to the bleeding means by means of a valve, for example a flap valve, or by means of a flow cross-section constriction. This valve can be electric, mechanical or pneumatic (controlled by a pressurized fluid). The valve can be controlled by the bled pressurized gas. In this case, as explained above, the valve can be closed when the gas pressure is lower than a particular threshold and open when the pressure is greater than this threshold. This is particularly advantageous since the flap valve then functions autonomously, the pressurized gases feeding the second line of the ejector when their pressure is sufficient to open the flap valve. The flap valve can be designed to open when the aircraft is in flight and when the engine is in cruising mode, for example.

According to one embodiment, the pumping means are incorporated in the collector. In other words, the pumping means are fitted in or on the collector, thereby reducing the size of the device. If the pumping means comprise an ejector of the aforementioned type, the second line of the ejector can be fitted in the collector in the region of an outlet for liquids drained from the collector, which outlet thus forms the first line of the ejector. In a variant, the pumping means are located at a distance from the collector and connected to a liquid outlet thereof by means of a conduit.

Preferably, the monitoring means comprise a visual and/or electrical alarm designed either to be visible to an operator inspecting the collector, or to emit a signal intended for the cockpit of the aircraft. The alarm is triggered when the flow rate filling the collector is greater than the delivery of the pumping means. The alarm allows any anomalous leak in the engine to be indicated, as explained above. In a variant, the monitoring means can comprise an inspection hole or window provided in the collector. An operator can thus check the level or volume of liquids in the collector and decide whether or not to carry out a maintenance operation. It is also possible to monitor several flow rate thresholds to observe the progression of a fault and schedule a check.

Advantageously, the monitoring means of the collector comprise an overflow designed to let liquids escape from the collector when the flow rate of collected liquids is greater than the delivery of the pumping means. Flows of oil or fuel to the outside are thus prevented apart from in the case of faults. If such a flow were to occur, an operator could easily confirm, for example by means of the drip marks at the overflow, that the collector has received too great a flow rate of liquids. The operator could then decide whether to carry out a maintenance operation.

Embodiments of the disclosure also relate to an aircraft engine comprising an exhaust nozzle for combustion gases. The engine comprises at least one draining device according to the disclosure, the outlet of the pumping means leading into the jet nozzle directly or by means of a conduit.

The drained liquids discharged from the collector are thus conveyed to the exhaust nozzle of the engine where they are combusted. As explained above, the time at which the drained liquids are discharged can be determined in advance, for example by means of a flap valve connected to the first or second line of a jet pump ejector forming the pumping means. It is thus conceivable to discharge the drained liquids into the jet nozzle only when the aircraft is in flight, so as to minimize external pollution.

Advantageously, the pumping means are connected to means for bleeding gas from either a compressor or a system for removing gas from the engine.

Embodiments of the disclosure also relate to an aircraft having a draining device according to the disclosure.

Embodiments of the disclosure also relate to a method for inspecting an engine, the method comprising a step of maintaining the engine after the monitoring means of the device have been activated.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
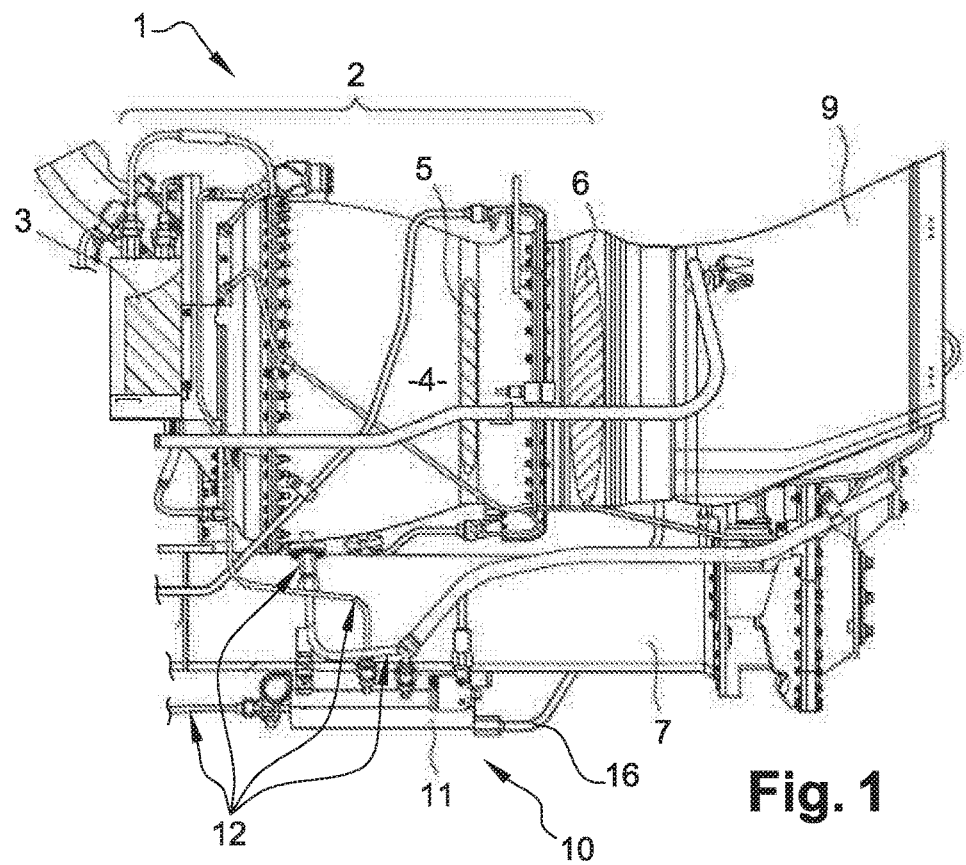
FIG. 1 is a schematic side view of an aircraft engine comprising a draining device according to the disclosure.

With reference to the side view in FIG. 1, an aircraft engine 1 (in this case an engine of a helicopter) comprises (seen in a cutaway view) a gas generator 2 formed by a compressor 3, by a combustion chamber 4 and by a turbine 5, which is connected to a free turbine 6. The free turbine 6 drives the main rotor (not shown) by means of a power shaft 7 via a gearbox (not shown). The gases from the combustion are ejected into an exhaust nozzle 9.

In order to make the engine clean, the engine 1 is provided with a drainage device 10 intended for collecting the residual liquids (fuel, oil, water condensates, impurities, etc.) coming from the engine.

Typically, a draining device 10 comprises a collector 11 and lines 12 for draining liquids originating from various parts of the engine, the outlets of which lines lead into the collector 11.

A device according to the disclosure for draining liquids further comprises means for pumping liquids held in the collector 11 and for discharging the liquids, and monitoring means designed to indicate when the liquids have been collected by the collector 11 in an anomalous manner.

Figure 2:
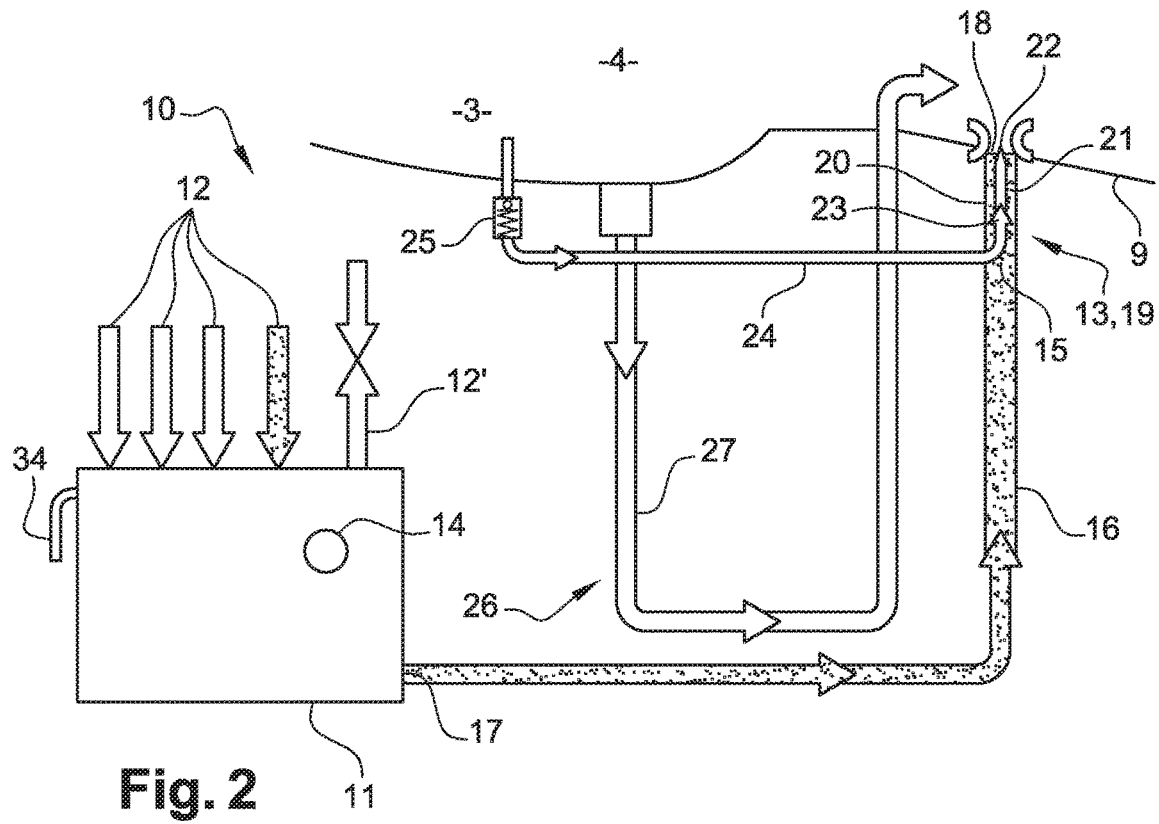
FIG. 2 is a schematic side view of a first embodiment of a draining device according to the disclosure.

FIG. 2 shows a first embodiment of the draining device 10 according to the disclosure, the pumping and discharging means and the monitoring means being denoted by the reference numerals 13 and 14, respectively.

In the example shown, the pumping and discharging means 13 comprise an inlet 15 connected to a liquid outlet 17 of the collector 11 by means of a conduit 16, and an outlet 18 leading into the exhaust nozzle 9 of the engine 1. The collector 11 receives the drained liquids from the lines 12 (shown schematically by arrows) and is preferably provided with a vent 12' for venting the internal cavity of the collector, in which the liquids are received.

In this case, the pumping and discharging means 13 comprise a jet pump ejector 19 provided with a first line 20 for the flow of drained liquids, one (upstream) end of which forms the aforementioned inlet 15 and the other (downstream) end of which forms the aforementioned outlet 18. As shown schematically in FIG. 1, the outlet 18 can comprise a constriction in its flow cross-section so as to define a diffuser downstream.

The pumping and discharging means 13 also comprise a second line 21 for atomizing pressurized gas, which in this case extends inside the first line 20 and is designed so that the atomized gas leaving the second line 21 forces the liquids flowing in the line 20 to be discharged towards the outlet thereof 18 and into the jet nozzle 9. This pressurized gas is intended to expand in the aforementioned diffuser, and this creates negative pressure and forces the drained liquids to flow as far as into the jet nozzle 9.

The second line 21 thus comprises a pressurized gas outlet 22 located in the region of the outlet 18 of the first line 20. The inlet 23 of the second line is connected, by means of a conduit 24, to means (not shown in the drawing) for bleeding pressurized gas from the engine 1. The pressurized gas can be bled from the compressor 3 of the engine, for example in the region of the plane P25 or P3 (the plane P25 being located between two impellers and the plane P3 being located downstream of these impellers).

To control both the activation of the pumping and the time at which the liquids are discharged into the jet nozzle 9, the conduit 24 is provided with a flap valve 25 that is intended to open and let the bled pressurized gas pass into the conduit as far as to the ejector 19 when the pressure of this gas is greater than or equal to a predetermined threshold value. In this case, the flap valve 25 is shown by means of a movable ball biased, by a compression spring, against a seat surrounding a gas outlet of the bleeding means. Thus, the flap valve 25 is actuated by the pressurized gas. The aforementioned gas pressure threshold value, which depends in particular on the spring rate of the spring in the above example, is preferably determined in order to precisely control the time at which the drained liquids are discharged, in particular so that the discharge does not occur as soon as the engine is ignited.

In this case, the means 14 for monitoring the collector 11 are shown by a single overflow 34. According to the disclosure, the monitoring means 14 are designed to be activated when the liquid flow rate received by the collector 11 is greater than the delivery of the pumping means 13 (ejector 19). The monitoring means 14 thus make it possible to indicate when the liquids have been collected by the collector 11 in an anomalous manner, in particular indicating a volume of drained liquid that is too high compared with the usual volume during normal operation of the engine.

When the flow rate of the collected liquids is greater than the delivery of the pumping means 13, the monitoring means 14 can be designed to emit a signal, which may be a visual and/or electrical alarm.

By setting the pumping delivery at a threshold value corresponding to normal functioning of the engine, i.e. to functioning for which the liquid losses and leaks that may appear do not affect the functioning of the engine, the pumping means 13 no longer have to discharge the collected liquids as soon as the flow rate of the collected liquids is greater than the pumping delivery. Where allowed by the collector, the level of liquids in the collector 11 will thus increase if there is an engine fault.

Where the collector 11 comprises a window through which an operator can see the level of liquids in the collector, this window, which is thus intended for alerting the operator (visual alarm), is comprised by the monitoring means 14.

In a variant or as an additional feature, the collector 11 can comprise an overflow 34 intended for letting the liquids escape from the collector 11, in particular when the volume of liquid collected is greater than the storage volume for the liquids in the collector 11. Instead of or in addition to the alarm means, an operator can see drip marks produced when the liquid passes the level of the overflow 34 if there is an engine fault, the overflow 34 thus forming another type of visual alarm. The overflow 34 can be connected, by means of a pipe, to the scupper of the engine deck or to an auxiliary recovery container.

As an electrical and visual alarm, the monitoring means 14 can comprise a sensor intended for detecting the level of liquids in the collector 11 and to emit a signal intended for the cockpit of the aircraft, which signal can be seen by the pilot by means of a warning light, for example.

The monitoring means 14 thus make it possible to detect a large, anomalous liquid leak sufficiently quickly to alert an operator or the aircraft pilot. The activation of the alarm indicates that an engine fault has occurred and that a maintenance operation should be carried out.

While not forming part of the disclosure, the engine, which is shown in a partial view in FIG. 2, comprises other draining means 26 which are used in this case to collect fuel that has not been combusted in the combustion chamber 4 and to discharge the fuel towards the jet nozzle 9 by means of a conduit 27, the outlet of which leads into the jet nozzle. The draining device 10 according to the disclosure is separate from these draining means 26, which are not provided with pumping means or monitoring means.

FIGS. 3 to 10 show alternative embodiments of the disclosure, in which the elements described above are denoted by the same reference numerals.

Figure 3:
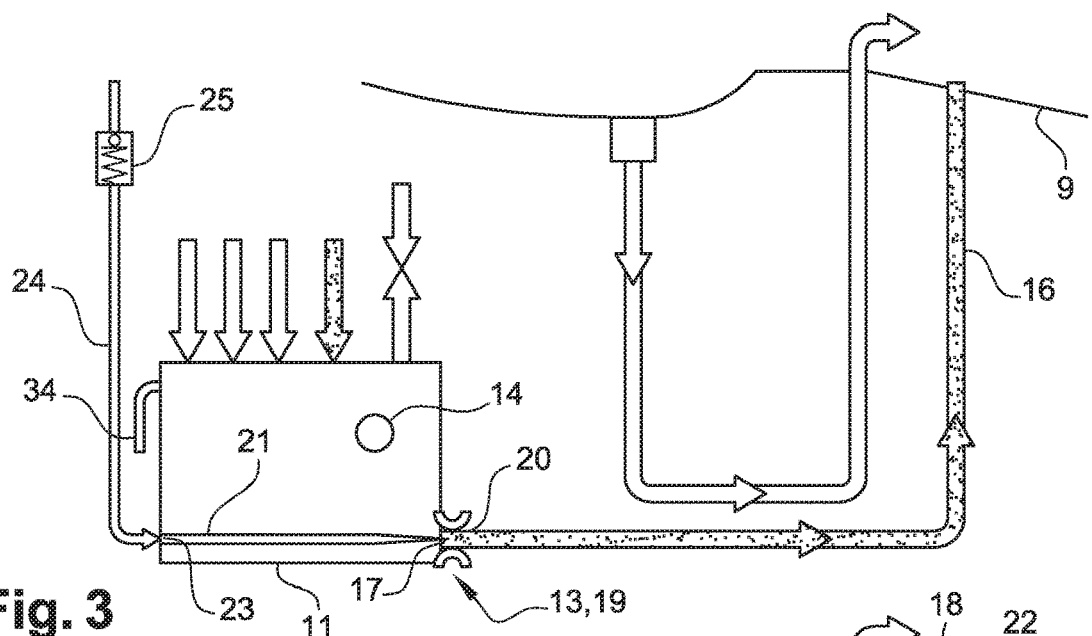
FIGS. 3 to 10 are schematic side views of alternative embodiments of the draining device according to the disclosure.

In the variant in FIG. 3, the pumping means 13 (ejector 19) are incorporated in the collector 11. The first line 20 is fitted directly at the liquid outlet 17 of the collector 11 and is connected to one end of a conduit 16, the other end of which leads into the jet nozzle 9. The second line 21 of the ejector 19 extends inside the first line 20 and its inlet 23 is connected, by means of a conduit 24 that can be provided with a flap valve 25, to the means for bleeding pressurized gas from the engine 1.

The draining device in FIG. 3 likewise comprises monitoring means 14 of the above type.

This device functions similarly to that in FIG. 2.

Figure 4:
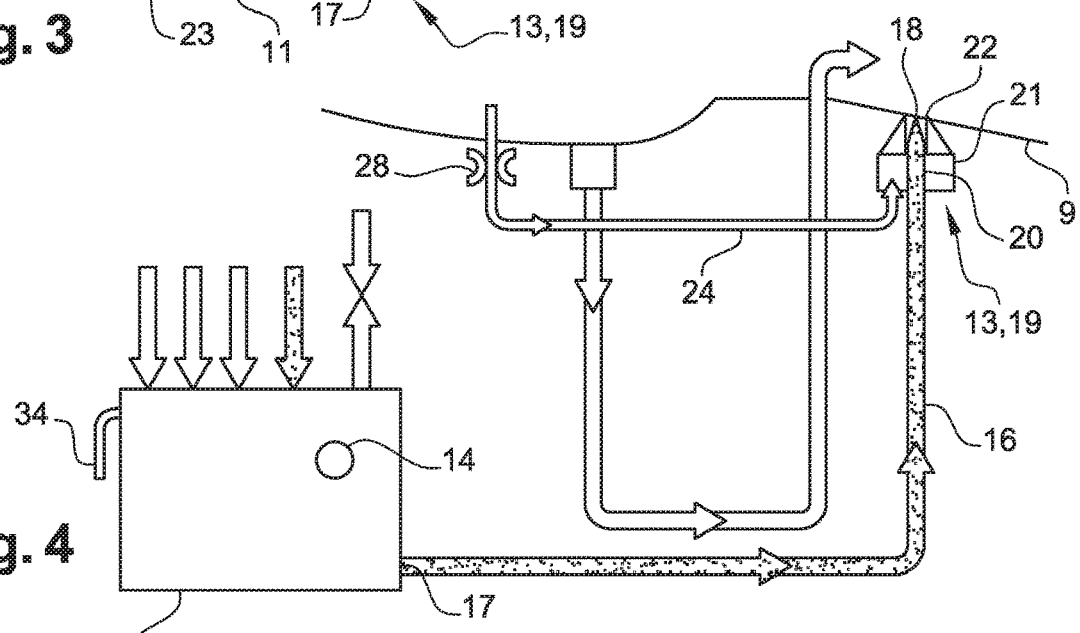

In the embodiment in FIG. 4, the pumping means 13 comprise an ejector 19, the first line 20 of which is fitted inside the second line 21 so as to form a nozzle. The inlet of the first line 20 is connected to the liquid outlet 17 of the collector 11 by means of the conduit 16. The inlet of the second line 21 is connected to air bleeding means by means of a conduit 24 and the outlet thereof extends around the outlet of the first line 20 and leads into the jet nozzle 9.

In this case, the ejector 19 functions like an exhaust nozzle in the manner of a paint spray gun, which operates by expelling the pressurized gas around the outlet 18 of the first line 20 in order to spray the liquids from the collector 11 towards the jet nozzle 9.

In addition, the conduit 24 connecting the second line 21 of the ejector to the bleeding means is provided with a constriction 28 in its flow cross-section (instead of the flap valve 25 in FIG. 2). This constriction 28 makes it possible to delay the discharge of the liquids so that it does not take place as the engine is started up. The pressure thus increases slightly in the second line 21 of the ejector during start-up, the liquids being discharged into the jet nozzle 9 when a predetermined pressure threshold is exceeded.

The draining device likewise comprises monitoring means 14 of the above type.

Figure 5:
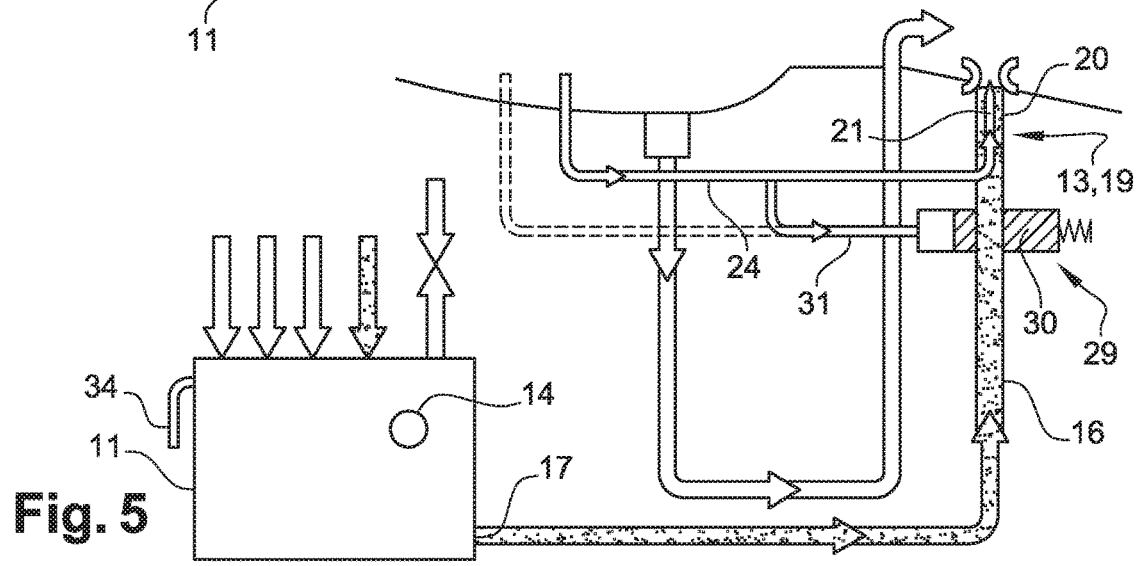

The alternative embodiment in FIG. 5 differs from the embodiment in FIG. 2 mainly in that the conduit 24 is not provided with a flap valve or constriction. Instead, a valve 29, for example a slide valve, is fitted on the conduit 16 that connects the outlet 17 of the collector 11 to the inlet of the first line 20 of the ejector 19.

The valve 29 comprises an inlet connected to the outlet 17 of the collector 11 by means of a portion of the conduit 16, and an outlet connected to the inlet of the first line 20 of the ejector 19 by means of another portion of the conduit 16. The valve 29 further comprises an internal member 30, which can move between a closed position of the aforementioned outlet and/or inlet of the valve 29, and a position in which the inlet and the outlet of the valve 29 are in fluid communication. The member 30 is biased by a spring into the closed position of the valve 29. The movement of this member 30 is controlled by pressurized gas, which in this case is a portion of the pressurized gas bled from the engine by the aforementioned bleeding means. To do so, the conduit 24 connecting the bleeding means to the ejector 19 can comprise a bypass 31 connected to a cavity in the valve 29 in which the member is movably fitted. The valve 29 is intended to open when the pressure of the bled gas is greater than or equal to a predetermined threshold value, which depends in particular on the spring rate of the spring in the above example, and which is preferably determined so as to precisely control the time at which the drained liquids are discharged, in particular so that the discharge does not occur as soon as the engine is ignited.

Alternatively, and as shown by dashed lines in FIG. 5, the conduit 31 can be connected, by its end opposite the valve, to means for bleeding air from the compressor of the engine.

Figure 6:
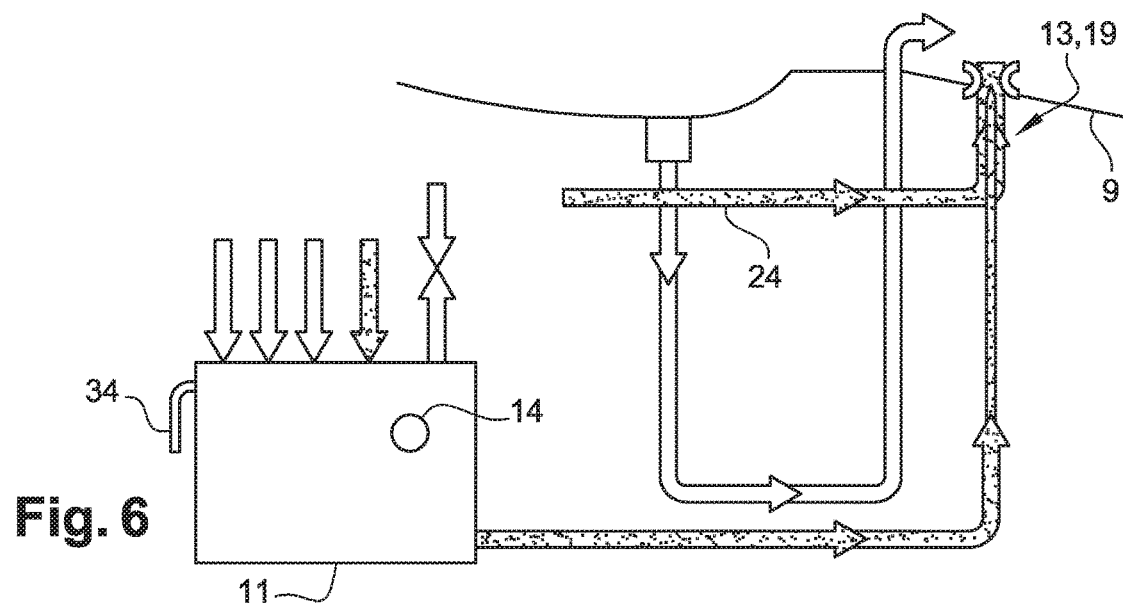

The alternative embodiment in FIG. 6 differs from the embodiment in FIG. 2 mainly in that the conduit 24 is connected to means for bleeding pressurized gas, not from the compressor of the engine but from a system (not shown) for removing gas from the engine. Thus, the liquids are discharged into the jet nozzle 9 by means of the system for removing gas from the engine.

Figure 7:
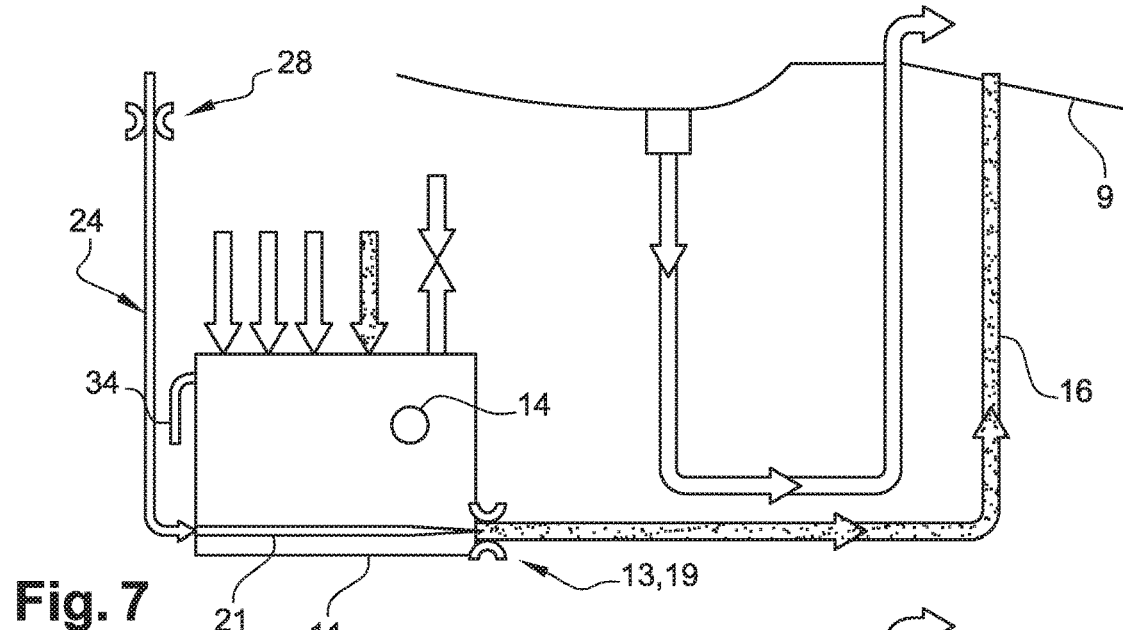

The alternative embodiment in FIG. 7 differs from the embodiment in FIG. 3 mainly in that the conduit 24 connecting the second line 21 of the ejector to the bleeding means is provided with a constriction 28 in its flow cross-section (instead of the flap valve 25 of FIG. 3). This constriction 28 has the same function as the constriction described with reference to FIG. 4.

Figure 8:
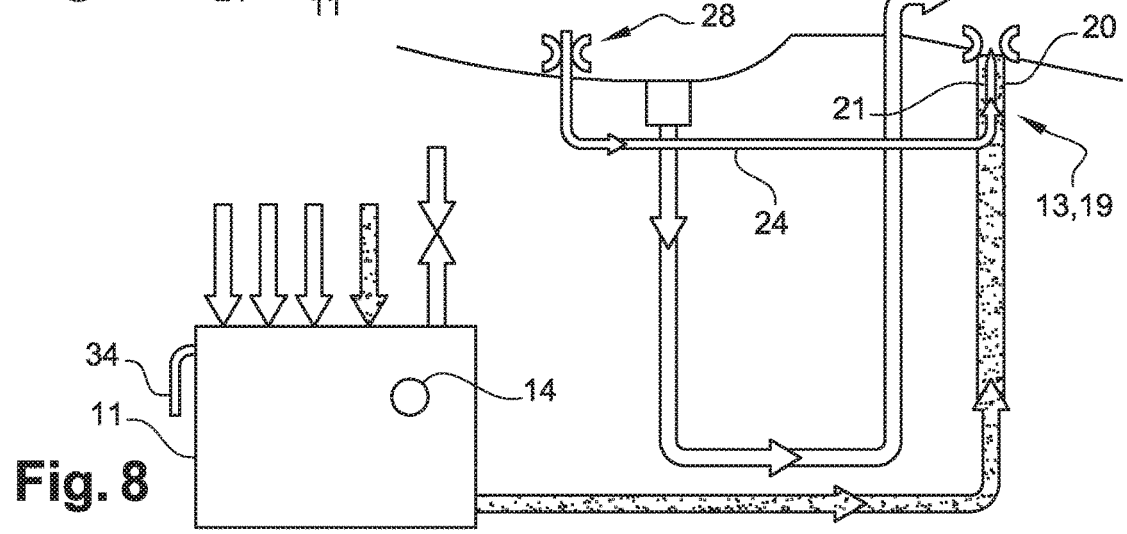

The alternative embodiment in FIG. 8 differs from the embodiment in FIG. 2 mainly in that the conduit 24 connecting the second line 21 of the ejector to the bleeding means is provided with a constriction 28 in its flow cross-section (instead of the flap valve 25 in FIG. 2). This constriction 28 has the same function as the constriction described with reference to FIG. 4.

Figure 9:
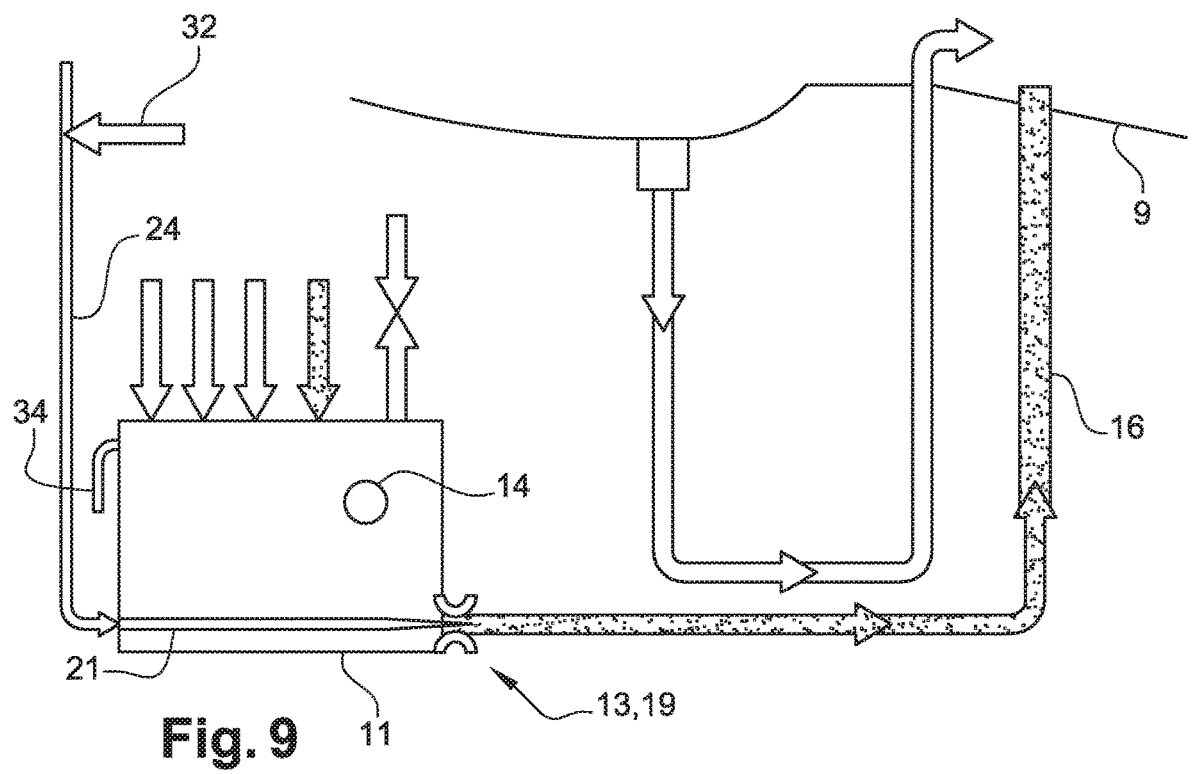

The alternative embodiment in FIG. 9 differs from the embodiment in FIG. 3 mainly in that the conduit 24 connecting the second line 21 of the ejector 19 to the bleeding means is provided with an electrically controlled valve 32 (instead of the flap valve 25 in FIG. 3). This valve 32 is intended to open to allow the bled pressurized gas to pass through when the valve is activated by a command sent by an engine computer, for example.

Figure 10:
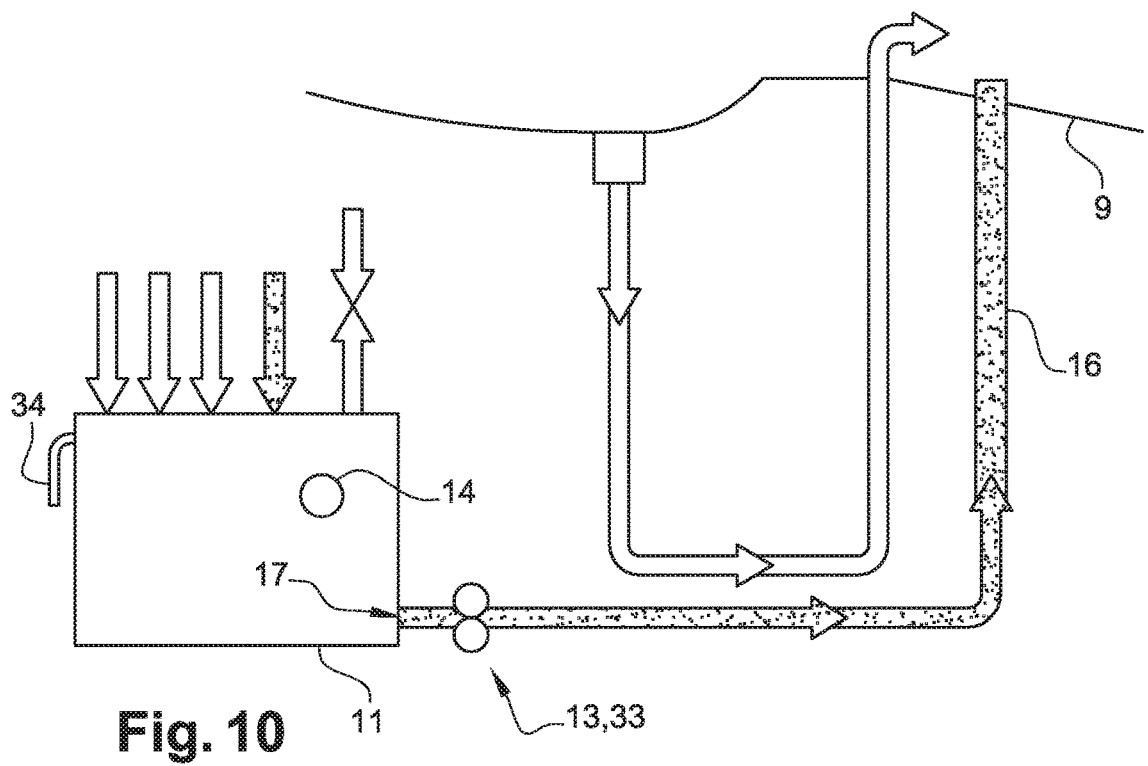

In the alternative embodiment in FIG. 10, the pumping means 13 of the draining device comprise an electrical or mechanical pump 33 fitted on the conduit 16, one end of which pump is connected to the outlet 17 of the collector 11 and the opposite end leads into the jet nozzle 9. When activated, this pump 33 carries the liquids from the collector 11 to the jet nozzle 9. The delivery of this pump is also calibrated so as to set a delivery threshold, beyond which the monitoring device indicates anomalous functioning of the engine. This variant does not need a valve, a constriction or air to be bled. The draining device likewise comprises monitoring means 14 of the above type.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A device for draining liquids of an aircraft engine, comprising:
   a collector designed to collect liquids drained from the engine;
   means for pumping liquids collected in the collector from the collector for discharging said liquids; and
   monitoring means designed to indicate when the liquids have been collected by the collector in an anomalous manner, said monitoring means being designed to be activated when the flow rate of collected liquids is greater than the delivery of the pumping means;
   wherein the collector comprises an overflow designed to allow liquids to escape from the collector when the flow of collected liquids is greater than the delivery of the pumping means.

2. The device according to claim 1, wherein the pumping means comprises a jet pump ejector, said jet pump ejector comprising a first line for the flow of drained liquids, one end of which forms an inlet for the liquids held in the collector and the other end of which forms an outlet for discharging the liquids, and a second line for atomizing pressurized gas, which line extends around or inside the first line and is designed so that the atomized gas leaving said second line forces the liquids to be discharged through the outlet of the first line.

3. The device according to claim 2, wherein the first line is connected to a valve.

4. The device according to claim 2, wherein the second line comprises a gas inlet that is connected to a source of pressurized gas.

5. The device according to claim 1, wherein the pumping means are incorporated in the collector or are located at a distance from the collector and connected to a liquid outlet thereof by a conduit.

6. The device according to claim 1, wherein the monitoring means comprise a visual and/or electrical alarm designed to be visible to an operator inspecting the collector or to emit a signal intended for the cockpit of the aircraft.

7. An aircraft engine, comprising:
an exhaust nozzle for combustion gases; and
at least one device according to claim 1, wherein an outlet of the pumping means leading into the exhaust nozzle directly or by a conduit.

8. The aircraft engine according to claim 7, wherein the pumping means are connected to a compressor or a system for removing gas from the engine.

9. A method for inspecting an engine according to claim 7, said method comprising:
maintaining the engine after the means for monitoring the device have been activated.

10. The device according to claim 1, wherein the pumping means includes an electric pump, a mechanical pump, a pneumatic pump, or a jet pump ejector.

11. A device for draining liquids for an aircraft engine, comprising:
a collector configured to collect liquids drained from the engine via one or more drain lines, wherein the liquids comprise hydrocarbons;
one of an ejector or a pump, in fluid communication with the collector and configured to discharge the liquids collected by the collector; and
an overflow alert configured to indicate a collector overflow condition, wherein the collector overflow condition occurs when the flow rate of collected liquids in the collector is greater than the outflow of liquids from the collector; and
an overflow pipe associated with the overflow alert, the overflow pipe configured and arranged to permit the collected liquids to exit the collector when the collection overflow condition occurs.

12. The device of claim 11, wherein the overflow alert includes a visual or audible alarm.

13. The device of claim 11, wherein the overflow alert is visual and includes a window mounted to the collector for allowing visual confirmation of a fluid level of the liquids collected in the collector.

14. The device of claim 11, wherein the overflow alert is configured to generate a signal based on the collector overflow condition, and wherein the collector overflow condition occurs when liquids collected by the collector are abnormal.

15. The device of claim 14, wherein the overflow alert includes a sensor configured to detect a fluid level of the liquids collected in the collector.

16. The device of claim 11, wherein said one of an ejector or a pump is an ejector comprising a first line for outflow of liquids from the collector, one end of the first line forming an inlet for the liquids held in the collector and the other end of first line forming an outlet for discharging the liquids toward a jet nozzle, and a second line for atomizing pressurized gas, the second line communicating with the first line and configured so that the atomized gas leaving the second line forces the liquids to be discharged through the outlet of the first line.

17. The device of claim 16, wherein the second line is connected to a valve.

18. The device of claim 17, wherein the second line comprises a gas inlet that is selectively connected to a source of pressurized gas by the valve.

19. The device of claim 11, wherein said one of an ejector or a pump is an ejector comprising a first line for outflow of liquids from the collector, one end of the first line forming an inlet for the liquids held in the collector and the other end of first line forming an outlet for discharging the liquids toward a jet nozzle, and wherein said ejector further comprises a second line in communication with a source of pressurized gas, the second line having an outlet positioned to discharge pressurized gas adjacent the outlet of the first line.

* * * * *